Dec. 22, 1970  G. A. MARSH ET AL  3,549,993
CORROSION RATE MEASURING METHOD BY MAINTAINING ELECTROLYTIC
CONTACT AND EXCLUDING ANY SUBSTANTIAL OXYGEN
CONTACT WITH A TEST SPECIMEN
Filed June 14, 1966

INVENTORS
GLENN A. MARSH
EDWARD SCHASCHL
BY
Dean Sandford
ATTORNEY 3,549,993
CORROSION RATE MEASURING METHOD BY MAINTAINING ELECTROLYTIC CONTACT AND EXCLUDING ANY SUBSTANTIAL OXYGEN CONTACT WITH A TEST SPECIMEN
Glenn A. Marsh and Edward Schaschl, Fullerton, Calif., assignors to Union Oil Company of California, Los Angeles, Calif., a corporation of California
Continuation-in-part of abandoned application Ser. No. 213,171, July 30, 1962. This application June 14, 1966, Ser. No. 557,492
Int. Cl. G01n 27/00
U.S. Cl. 324—71                7 Claims

ABSTRACT OF THE DISCLOSURE

A corrosion test probe comprised of a corrodible test element enclosed in an electrically conductive, oxygen-impermeable material that renders the test element anionic, and a method for determining the maximum corrosion rate of a cathodically protected corrodible object exposed to a corrosive environment by measuring the corrosion rate of a test specimen placed in the corrosive environment and electrically connected to the corrodible object and maintained out of contact with oxygen. The test specimen can be temperature compensated for improved accuracy.

---

Figure 1:
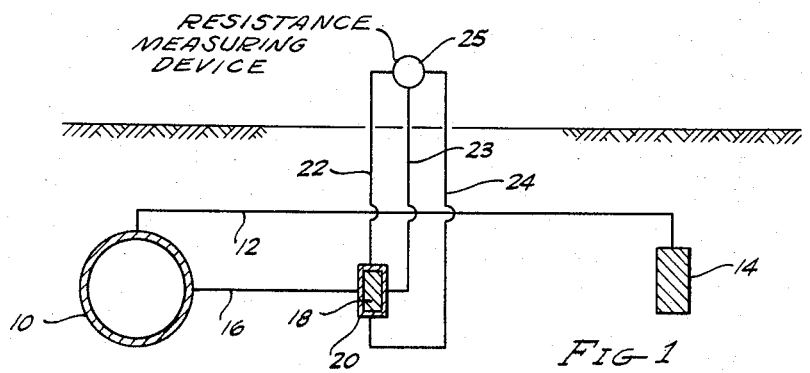

This is a continuation-in-part of application Ser. No. 213,171, filed July 30, 1962, and now abandoned.

This invention relates to corrosion measurement and, more particularly, to an apparatus and method for evaluating cathodic protection.

Almost any metallic surface exposed to a corrosive electrolytic environment, such as being disposed in damp soil or water, can be cathodically protected from corrosion. In conventional cathodic protection systems for mitigating the corrosion of submarine or subterranean metallic structures, sacrificial anodes of a metal higher in the electromotive series than the structure, such as magnesium or zinc in the case of ferrous structures, are electrically connected to the structure and disposed within the electrolytic environment. Less expensive anodic metals, such as scrap iron, can also be utilized as anodes in combination with an auxiliary current source to drive current from the anode to the structure being protected. Cathodic protection of the structure is achieved when cathodic areas of the structure receive all electrons utilized in the cathodic process from the auxiliary anode, and not from the local anodes of the structure itself. Generally, protection is achieved when the potential of the structure has been depressed to −0.85 volt with reference to a saturated copper-copper sulfate half cell. Under the condition of complete cathodic protection, local cathodes in the structure are assumed to be polarized to the open circuit potential of the anodes.

In conventional practice, potential measurements are usually utilized as the criterion of protection. While these measurements are simple and convenient to take, they suffer from the disadvantage that they are indirect, and one may get different values of potential, depending upon the location of the reference electrode. It is desirable, therefore, to study the actual corrosion rate of the metallic structure. While measurement of the corrosion rate of the structure is generally not feasible, an electrical resistance corrosion probe disposed in the corrosive electrolytic environment and electrically connected to the structure can be used to determine if cathodic protection has been achieved. Such a corrosion probe is described in U.S. Pat. 2,869,003, issued Jan. 13, 1959. While the use of a corrosion probe as described in the aforementioned patent can give useful results, the information obtained therewith might not be completely reliable because of the possibility that the probe might be inserted at a normally cathodic part of the structure, that is, where the corrosion rate is normally much lower than the corrosion rate at anodic parts of the structure.

In accordance with this invention, the maximum corrosion rate at the most anodic regions of a cathodically protected metallic structure is monitored by measuring the corrosion rate of a corrodible metallic specimen which is electrically connected to the structure and disposed in the corrosive electrolytic environment, such that it is maintained in electrolytic communication with the anodes of the cathodic protection system but is shielded from the dissolved oxygen in the electrolytic environment.

Accordingly, it is the primary object of this invention to provide a novel corrosion-measuring apparatus and method.

Another object of this invention is to provide an apparatus and method for evaluating cathodic protection of a metallic structure exposed to a corrosive electrolytic environment.

Still another object of this invention is to provide a method for the investigation of the corrosion rate of a cathodically protected metallic structure by the utilization of a corrodible specimen, which is maintained in electrical communication with the structure and electrolytic communication with the anode of the protection system, but is shielded from the dissolved oxygen in the corrosive environment.

Figure 2:
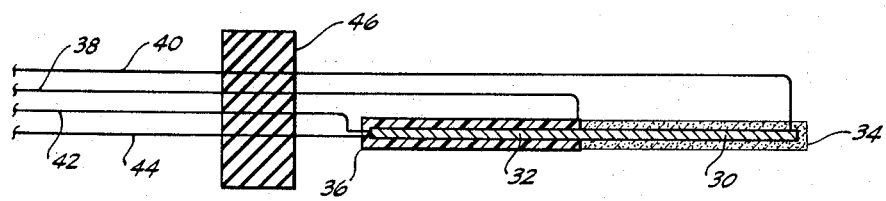
Figure 3:
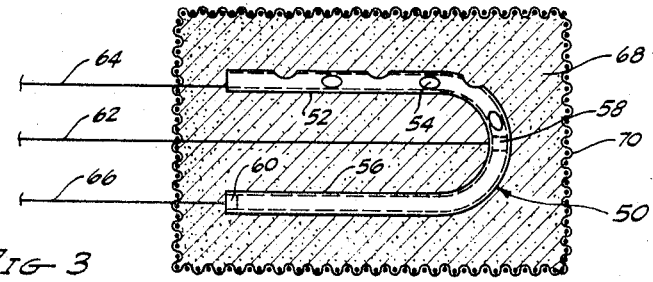
Figure 4:
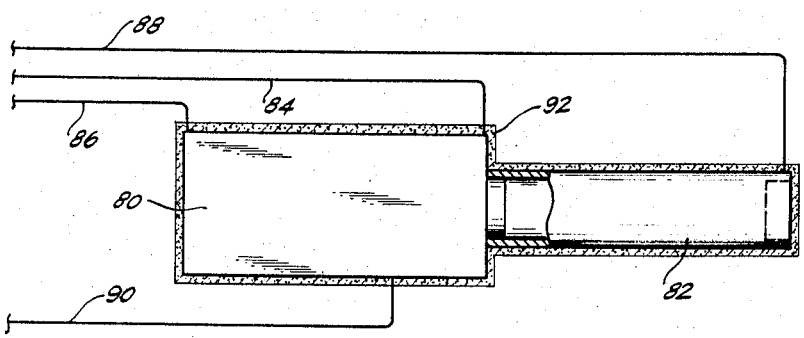

These and further objects of this invention will be described or become apparent as the description herein proceeds and reference is made to the accompanying drawings in which:

FIG. 1 is a sectional view of an installation employing the apparatus of this invention for monitoring the corrosion rate of a cathodically protected buried metallic structure; and FIGS. 2, 3, and 4 are partial cross-sectional views of exemplary corrosion probes of this invention.

Briefly, this invention comprises disposing a corrodible metallic specimen in the corrosive electrolytic environment in which a cathodically protected metallic structure is buried or submerged. The corrodible metallic specimen and the structure being cathodically protected are electrically connected by an electrical conductor, and a special barrier constructed of an electrolytically conductive, oxygen-impermeable material is provided around the specimen. The corrosion rate of the cathodically protected structure is then approximated by measuring the corrosion rate of the corrodible specimen.

The corrosion rate of the metallic specimen can be periodically measured by removing it from the electrolytic environment and barrier, and weighing it. The reduction in weight of the specimen is indicative of its corrosion. It will be evident that this is a costly and time-consuming method of determining the corrosion rate of the corrodible specimen. However, since the corrodible metallic specimen is electrically conductive, the well-known correlation between change in electrical conductivity and change in cross-sectional area can be used in measuring the corrosion rate of the specimen by periodically measuring its resistance. In view of the very significant effect that temperature has on electrical resistance, it is desirable to utilize the temperature-compensating type of corrosion probe, which is known in the art, modified in accordance with this invention.

The temperature-compensating corrosion probes which may be modified in accordance with this invention are generally of two types. The first type employs one test specimen exposed to the corrosive environment and a protected compensating specimen to provide automatic temperature-resistance compensation. The compensating specimen is isolated from the corrosive environment by being ensheathed in a protective coating, such as corrosion-resistant plastic, to prevent its corrosion. The second type of temperature-compensating probe has two bare specimens which are exposed to the corrosive environment, with the compensating specimen being adapted to corrode more slowly than the test specimen, as by being made thicker or having less surface area exposed to corrosion, instead of being coated with an impervious material. With this type of probe, the percentage reduction in the cross-sectional area of the compensating element due to corrosion is less than the percentage reduction in the cross-sectional area of the test element, either because the compensating element is initially thicker or because it has less surface subject to corrosion attack. Modification of these corrosion probes in accordance with this invention comprises ensheathing the unprotected test specimen of the unexposed-reference type probe and both specimens of the exposed-reference type probe in an electrolytically conductive, oxygen-impermeable barrier, and electrically connecting the test specimen to the structure being cathodically protected. Instrumentation which can be used in connection with these modified corrosion probes includes electrical bridge circuits such as described in U.S. Pats. 2,834,283 and 2,830,265, issued to L. E. Ellison.

Buried or submerged structures which are subject to rapid localized corrosion due to differential aeration cell attack generally exist in a damp, aerated environment. It has been found that the oxygen which sustains galvanic corrosion can find its way to the cathodic area of submerged structures by dissolving in the body of water in which the structure is submerged. Similarly, air is carried to buried structures by dissolving in rain water which drains downward from the surface of the earth to the buried structure. Thus, in any case, the oxygen necessary to sustain the corrosion reaction is dissolved in the electrolyte solution. The electrolytically conductive, oxygen-impermeable sheath around the corrodible specimen or corrosion test probe shields it from any substantial quantities of oxygen existing in the corrosive environment, thereby assuring that the test specimen will be at least as anodic as any portion of the structure being cathodically protected. As a result, no portion of the structure will corrode at a rate greater than that at which the ensheathed specimen corrodes.

The barrier material used to ensheath the test specimen desirably exhibits the properties of high electrolytic conductance and impermeability to nonionic dissolved gases and liquid fluids generally, and particularly to dissolved oxygen. Since the electrolytic conductance of the material is achieved by the diffusion of ions through the barrier material, materials having high permeability for ions are preferred. A number of materials having both a high degree of electrolytic conductance and which are substantially impervious to oxygen and nonionic fluids are known in the electrolysis and electrodialysis arts. While an ideal material suitable for the electrolytically conductive barrier is substantially impervious to oxygen, materials having limited permeabilities are satisfactory in many applications. Increased oxygen permeability has the effect of reducing the observed corrosion rate by rendering the test specimen less anodic. However, errors introduced by using materials having low permeabilities to oxygen are generally small. Thus, in many applications, satisfactory test results are obtained by ensheathing the probe in an electrolytically conductive, substantially oxygen-impermeable material.

Suitable electrolytically-conductive, substantially oxygen-impermeable materials include animal tissue, various gels such as silica gel and alumina gel, sponge saturated with agar gel, and paper dipped in collodion or agar gel, porous paper such as laboratory filter paper, and multiple layers of cloth. Where a relatively thick barrier of a moisture absorbing material such as animal tissue, agar-agar, silica gel, etc., is used, it is preferred to incorporate therein a small amount of a highly ionizing salt, such as sodium chloride or sodium sulfate, to increase the electrolytic conductivity of the barrier.

Also suitable are numerous resins which are commonly used in making semipermeable barriers. Where the material utilized is of itself too soft to provide sufficient rigidity, such as agar-agar, it may be coated on a plastic screen, or an insulation-coated metallic screen. The barrier will absorb or adsorb sufficient water or electrolyte from the surrounding earth or body of water to maintain a high electrolytic conductivity. Thus, while most barrier materials achieve an equilibrium water content, the material is substantially impermeable to water and other nonionized fluids once the equilibrium is established.

Another barrier for isolating the apparatus of this invention from the oxygen-containing electrolytic environment while maintaining it in electrolytic communication with the anode of the cathodic protection system, is a mixture of sandy soil with about 1% to 10% by weight of bentonite. The bentonite is capable of absorbing and retaining a small amount of electrolyte, thereby maintaining a high electrolytic conductivity. Upon absorbing water the bentonite swells and forms with the sandy soil a barrier capable of resisting the influx of additional ground water. Thus, the barrier material will in itself be damp or even wet, but will be impermeable to the flow of additional quantities of the electrolytic environment. Such a barrier, which, although damp is capable of resisting the flow of additional quantities of water meets the definition of a fluid-impermeable barrier, as used in this specification and in the appended claims. As in the case of some of the other barriers, it is preferred to incorporate in the bentonite a small amount of a highly ionizing salt to enhance the electrolytic conductivity thereof.

This invention is best understood by reference to the accompanying drawings wherein like numerals of reference represent corresponding components in each of the several figures. Referring to FIG. 1 which shows a probe of our invention monitoring the corrosion rate of a cathodically protected structure, the numeral 10 represents a buried pipeline which is electrically connected by conductor 12 to sacrificial anode 14. Sacrificial anode 14 is of a metal, such as magnesium, higher in the electromotive series than ferrous pipeline 10. Electrically connected to pipeline 10 by lead 16 is corrodible metallic specimen 18. Specimen 18 is ensheathed in electrolytically conductive, oxygen-impermeable barrier 20, such as a semipermeable membrane, to maintain it in electrolytic communication with anode 14 while shielding it from oxygen in the corrosive electrolytic environment in which pipeline 10, anode 14, and specimen 18 are disposed. Since specimen 18 is shielded from the oxygen and the ground water by barrier 20, it will be at least as anodic as any portion of pipeline 10, and, therefore, no portion of pipeline 10 will corrode at a rate greater than the rate at which specimen 18 corrodes. The corrosion rate of specimen 18 is periodically determined by removing specimen 18 and weighing it.

Several modifications of this system will be apparent. For example, sacrificial anode 14 may be of a metal which is not higher in the electromotive series than pipeline 10 if conductor 12 is provided with an auxiliary current source to drive current from anode 14 to pipeline 10. Since it is a costly and time-consuming operation to periodically remove specimen 18 to weigh it and thereby determine its corrosion rate, the metal loss can be determined by electrical resistance measurements. When the corrosion is determined by means of electrical resistance measurement, a temperature compensating probe comprising adjoined measurement and compensating elements is preferred. Where probe 20 is temperature compensated, it may be provided with leads 22 and 24 connected to its extremities and lead 23 connected at the intermediate junction of the two elements. The corrosion rate of specimen 18 may then be determined by connecting a suitable resistance measuring circuit 25 between leads 22, 23 and 24, and periodically measuring the change in resistance of specimen 18 to determine its corrosion rate, the two elements of probe 18 comprising separate resistances in the bridge circuit. There will be no danger of specimen 18 functioning as a sacrificial anode to change the overall corrosion rate of pipeline 10 since its area is relatively small in comparison to the area of pipeline 10. Although specimen 18 is illustrated as being disposed between pipeline 10 and anode 14, this is not essential. It is only essential that specimen 18 be disposed in the corrosive electrolytical environment in which pipeline 10 and anode 14 are disposed.

Specimen 18 may be installed by merely digging a hole therefor, disposing the specimen therein, and backfilling with the hereinbefore described mixture of sandy soil containing bentonite and an ionizing salt to isolate the specimen from the oxygen-containing ground water. After this installation, it is preferred to saturate the soil in which specimen 18 is buried with water to cause the bentonite to swell and form a barrier mass which is impermeable to ground water.

Referring to FIG. 2 which shows one embodiment of a temperature-compensating corrosion probe, test element 30 and compensating element 32 consist of a pair of serially connected specimens fabricated from a foil-like strip of metallic material of construction. Test element 30 is ensheathed with electrolytically conductive, oxygen-impermeable barrier 34 to shield it from oxygen in the corrosive environment while maintaining it in electrolytic commumnication with the environment. In the illustrated embodiment, barrier 34 consists of several layers of cotton cloth wetted with sodium chloride solution before ensheathing specimen 30 therewith. Compensating element 32 is ensheathed with an impermeable, corrosion-resistant, protective coating 36 which insulates it from contact with the corrosive environment. This feature provides the temperature-compensating feature of the corrosion-test probe. At the intermediate junction between specimens 30 and 32, there is electrically connected lead wire 38. Connected to the terminal extremities of specimens 30 and 32 are lead wires 40 and 42, respectively. Lead wires 38, 40 and 42 serve to connect the probe to a suitable electrical metering network such as disclosed in the Ellison patents cited above. Electrically connected to compensating specimen 32 is lead wire 44 which serves to connect the test specimen to the cathodically protected structure. The aforementioned conductors pass through insulating base 46 which provides support for the conductors and the probe.

In our copending patent application Ser. No. 160,506, filed Dec. 19, 1961, and now matured as Pat. No. 3,222,-920, there are described exposed-reference type corrosion probes fabricated of a single-strip, metallic stock. Accurate temperature-resistance compensation is achieved by the corrosion probes of said application since the reference specimen is exposed and both specimens have the same temperature coefficient of resistance, being of the same stock. Referring to FIG. 3 wherein a corrosion probe of said copending application is illustrated modified in accordance with this invention, test element section 52 of U-shaped tube 50 is provided with a plurality of ports 54 through the wall thereof. The longitudinal opening in section 56 of tube 50, which is to serve as the compensating element, is closed where section 52 adjoins section 56 and at the terminal extremity of section 56 by plugs 58 and 60, which fluid-tightly engage the inner surface of section 56. Electrically connected to tube 50 at the intermediate junction between sections 52 and 56 is lead wire 62, while lead wires 64 and 66 are connected to the respective terminal ends of sections 52 and 56. In this embodiment, electrolytically conductive, oxygen-impermeable barrier 68 is the mixture of sandy soil, bentonite, and an ionizing salt hereinbefore described. Barrier 68 is provided around compensating element 56 as well as test element 52, and it is held in place by plastic screen 70. Since no separate electrical lead is provided to complete the electrical connection between element 52 and the cathodically protected structure (lead 16 in FIG. 1 and lead 44 in FIG. 2), a lead wire for such a purpose can be connected to either of the leads 62, 64, or 66. Leads 62, 64 and 66 serve to connect the assembled probe assembly to a suitable measuring circuit.

FIG. 4 illustrates another probe of said Pat. No. 3,222,920 modified in accordance with this invention. The corrosion-test probe illustrated in FIG. 4 is constructed from a single, undivided length of tubular material by making a transverse cut through the wall of a tubular member, near the midpoint and substantially normal to the axis thereof, extending partially about its periphery to define test element section 80 and compensating element section 82. A second longitudinal cut is then made through the wall of test element portion 80 from the first cut to the terminal extremity of section 80, which is then spread open to provide a substantially flat section exposed to the corrosive environment on both sides. A fluid-tight seal and an electrical junction are then created by crimping the end of tubular section 82 adjacent to section 80 closed on lead wire 84 and/or soldering said end of section 82 and lead wire 84, as illustrated. The other end of section 82 is similarly sealed. Lead wires 86 and 88 are then electrically connected, such as by soldering, to the terminal extremities of sections 80 and 82, respectively. Electrically connected to test element 80 is lead wire 90 which serves to complete the electrical connection between test element 80 and the cathodically protected structure. Test element 80 and compensating element 82 are ensheathed with an electrolytically conductive, oxygen impermeable barrier 92, such as several layers of cotton cloth wetted with sodium chloride solution. Both the probe embodiments of FIGS. 3 and 4 can be provided with supporting bases of conventional type.

The electrical resistance of the protected reference type probe of FIG. 2 is responsive only to temperature. In the case of the exposed reference probe, the electrical resistance of the compensating element is responsive to both temperature and the amount of corrosion which it has suffered. However, the compensating element, because of its construction, will corrode more slowly than the test element. For example, the compensating elements of FIGS. 3 and 4 are subject to corrosion on one surface only, whereas the test elements are subject to attack on two surfaces. However, with either type of probe, corrosion is calculated by conventional techniques using the measured values of electrical resistance. Corrosion rates can be established by taking periodic readings in conventional manner.

From the description of our invention, it will be apparent that the test specimens are fabricated of any corrodible ferrous metallic material of construction. While the probes illustrated in FIGS. 3 and 4 must necessarily have specimens of the same metal stock, it is preferred that in other temperature-compensating probes, such as illustrated in FIG. 2, the test and reference specimens also be of the same metal or alloy and have substantially identical temperature coefficients of resistance. The dimensions of the test and reference specimens are not critical. In some instances, it may be desired to adjust the lengths of the test and reference specimens so that they will have the same initial resistance. The specimens of the probes illustrated in FIGS. 3 and 4 can be fabricated from tubular, corrodible, electrically conductive material of any cross-section, such as circular, rectangular, square, hexagonal, octagonal, etc. The assembled probes may be of any shape, as for example, the probe illustrated in FIG. 2 may be formed from a replicated, foil-like strip, and the probe illustrated in FIG. 3 may be elongated.

The lead wires are preferably coated with a corrosion-resistant material.

The corrosion resistant, substantially impermeable coatings for protecting the reference specimens may be any non-conducting material which prevents the corrosive environment from attacking the metal surface of the reference specimens. Included are such proprietary compounds and compositions as Tygon paint, Armstrong A–2 adhesive, Carbolene, Phenoline 300, Scotch Cast Resin-MM, Saueresin Cement (for high temperature applications) polytrifluoroethylene, polytetrafluoroethylene, and polyethylene. The coating should be of sufficient thickness to provide protection and may be applied by spraying, dipping, brushing, etc.

Although this invention has been described in relation to specific embodiments, it will be apparent that obvious modifications may be made by one skilled in the art without departing from the intended scope of this invention. For example, the specimens of this invention may be utilized for monitoring the corrosion rate of submerged as well as buried structures. Other corrosion probes which may be modified in accordance with this invention are described in U.S. Pats. Nos. 2,851,570, 2,878,354, and 2,991,439.

The embodiments of the invention in which an exclusive property or privilege is claimed are defined as follows:

1. A method of measuring the corrosion rate of a cathodically protected corrodible metallic structure exposed to a corrosive environment, which comprises:
   placing a corrodible metallic test specimen of a metal substantially identical in composition with said metallic structure in said corrosive environment;
   electrically connecting said test specimen to said metallic structure;
   maintaining said test specimen in electrolytic contact with said corrosive environment;
   excluding any substantial quantity of oxygen from contact with said test specimen; and
   periodically determining the corrosion rate of said test specimen.

2. The method defined in claim 1 wherein the corrosion rate of said test specimen is determined by measuring the increase in electrical resistance of said corrodible test specimen and wherein the effect of temperature on said electrical resistance is compensated for by measuring the electrical resistance of a second test specimen of similar metal placed in said corrosive environment and serially connected to said corrodible test specimen, said second test specimen having an impermeable, protective coating of corrosion resistant material.

3. The method defined in claim 1 wherein said test specimen is maintained in electrolytic contact with said corrosive environment and oxygen is excluded from contact with said test specimen by encasing said test specimen in a sheath of electrolytically conductive, substantially oxygen impermeable material.

4. The method defined in claim 3 in which said electrolytically conductive, substantially oxygen-impermeable material is selected from the group consisting of animal tissue, agar-agar, silica gel, alumina gel, a mixture of sandy soil and about 1 to 10% by weight of bentonite, a plurality of layers of cloth, and a plurality of layers of porous paper.

5. The method defined in claim 4 in which a small amount of a strongly ionizing salt is added to the material forming said sheath.

6. A method of measuring the corrosion rate of a cathodically protected corrodible metallic structure exposed to a corrosive environment, which comprises:
   placing a test specimen of a metal substantially identical in composition with said metallic structure in said corrosive environment, said specimen comprising a first corrodible element and a second temperature compensating element provided with a protective corrosion resistant covering;
   electrically connecting said test specimen to said metallic structure;
   maintaining said first corrodible element in electrolytic contact with said corrosive environment;
   excluding any substantial quantity of oxygen from contact with said first corrodible element;
   measuring the electrical resistance of said first corrodible element and said second temperature compensating element by means of an electrical bridge circuit external of said corrosive environment; and
   computing the corrosion rate of said first corrodible element of said specimen from the measured resistance of said first and said second elements.

7. The method defined in claim 6 wherein oxygen is excluded from contact with said first corrodible element by coating the element with an electrolytically conductive material that is substantially impermeable to oxygen.

References Cited

UNITED STATES PATENTS

| | | | |
|---|---|---|---|
| 2,805,198 | 9/1957 | Robinson et al. | 324—29UX |
| 2,824,283 | 2/1958 | Ellison | 324—71X |
| 2,830,265 | 4/1958 | Ellison | 324—71X |
| 2,869,003 | 1/1959 | Marsh et al. | 307—95 |
| 2,876,321 | 3/1959 | Amdur et al. | 324—65UX |
| 2,956,225 | 10/1960 | Marsh et al. | 324—71 |
| 3,004,232 | 10/1961 | Schaschl et al. | 324—71X |
| 3,124,771 | 3/1964 | Rohrbach | 324—71X |
| 3,222,920 | 12/1965 | Marsh et al. | 324—71 |

E. E. KUBASIEWICZ, Primary Examiner

U.S. Cl. X.R.

204—1; 338—13